US012600233B2

(12) United States Patent
Miyazawa

(10) Patent No.: US 12,600,233 B2
(45) Date of Patent: Apr. 14, 2026

(54) VEHICLE DISPLAY DEVICE

(71) Applicant: Yazaki Corporation, Tokyo (JP)

(72) Inventor: Tomohiro Miyazawa, Shizuoka (JP)

(73) Assignee: YAZAKI CORPORATION, Minato-ku (JP)

( * ) Notice: Subject to any disclaimer, the term of this patent is extended or adjusted under 35 U.S.C. 154(b) by 36 days.

(21) Appl. No.: 18/965,208

(22) Filed: Dec. 2, 2024

(65) Prior Publication Data

US 2025/0091440 A1 Mar. 20, 2025

Related U.S. Application Data

(63) Continuation of application No. PCT/JP2023/021494, filed on Jun. 9, 2023.

(30) Foreign Application Priority Data

Jul. 5, 2022 (JP) ................................. 2022-108506

(51) Int. Cl.
*B60K 35/233* (2024.01)
*B60K 35/28* (2024.01)
*B60K 35/81* (2024.01)

(52) U.S. Cl.
CPC ........... *B60K 35/233* (2024.01); *B60K 35/28* (2024.01); *B60K 35/81* (2024.01); *B60K 2360/23* (2024.01)

(58) Field of Classification Search
CPC ...... B60K 35/233; B60K 35/81; B60K 35/28; B60K 2360/23

(Continued)

(56) References Cited

U.S. PATENT DOCUMENTS 8,708,498 B2 * 4/2014 Sasaki .................... G06V 40/19
353/13
11,968,352 B2 * 4/2024 Yasui ................... H04N 13/324

(Continued)

FOREIGN PATENT DOCUMENTS

JP 2016130771 A * 7/2016
JP 2019-089480 A 6/2019
JP 2020-170136 A 10/2020

OTHER PUBLICATIONS

Tomoi Nishimura, Autostereoscopic display with wide viewing zone using binocular image control method in divided area based on viewing position, Dec. 14, 2021, SPIE Digital Library, Optical Engineering, vol. 60, Issue 12 (Year: 2021).*

(Continued)

*Primary Examiner* — Matthias S Weisfeld
(74) *Attorney, Agent, or Firm* — Sughrue Mion, PLLC

(57) ABSTRACT

A vehicle display device includes an image display device having a display surface that displays an image, an optical system that projects display light of the image toward a reflection surface in front of a driver, and a control unit, wherein the display surface includes a first region and a second region, wherein the control unit causes the image display device to display a first image when a display position of the image is in the first region, and causes the image display device to display a second image when a display position of the image is in a boundary between the first region and the second region, and wherein the second image is an image having a pattern different from a pattern of the first image, and has a configuration in which a low luminance portion and a high luminance portion are combined.

5 Claims, 14 Drawing Sheets

(58) Field of Classification Search
USPC .......................................................... 701/36
See application file for complete search history.

(56) References Cited

U.S. PATENT DOCUMENTS

| | | | | |
|---|---|---|---|---|
| 2009/0140845 A1* | 6/2009 | Hioki | .................... | G02B 27/01 |
| | | | | 340/425.5 |
| 2011/0001639 A1* | 1/2011 | Sasaki | ................ | G02B 27/0101 |
| | | | | 340/425.5 |
| 2015/0287230 A1* | 10/2015 | Cerny | .................... | G06T 17/10 |
| | | | | 345/501 |
| 2019/0137770 A1* | 5/2019 | Huang | .................... | G06F 3/011 |
| 2020/0320960 A1 | 10/2020 | Yamase | | |
| 2021/0302730 A1* | 9/2021 | Kusafuka | ............... | B60K 35/22 |
| 2022/0350139 A1* | 11/2022 | Tsuda | .................. | G01C 21/365 |

OTHER PUBLICATIONS

Jin-Ho Lee, Optical design of automotive augmented reality 3D head-up display with light-field rendering, Mar. 5, 2021, SPIE Digital Library Advances in Display Technologies XI (Year: 2021).*

* cited by examiner

VEHICLE DISPLAY DEVICE

CROSS-REFERENCE TO RELATED APPLICATION

This application is a continuation application of International Application No. PCT/JP2023/021494 filed on Jun. 9, 2023 which claims the benefit of priority from Japanese Patent Application No. 2022-108506 filed on Jul. 5, 2022 and designating the U.S., the entire contents of which are incorporated herein by reference.

BACKGROUND OF THE INVENTION

1. Field of the Invention

The present invention relates to a vehicle display device.

2. Description of the Related Art

In the related art, there is a device that displays an image in a vehicle. Japanese Patent Application Laid-open No. 2020-170136 discloses a vehicle display device that sets an image display region on a display surface so that a driver can visually recognize the entire displayed image according to the acquired eye position.

In order to display a virtual image in a wide range, it is preferable to display an image using the entire display surface. On the other hand, in a case where an image is displayed at a boundary between a display region visually recognized with only one eye and a display region visually recognized with both eyes, there is a possibility that visibility of the image is reduced. For example, since the shape of the image visually recognized by the left eye and the shape of the image visually recognized by the right eye are different from each other, the driver may feel uncomfortable.

SUMMARY OF THE INVENTION

An object of the present invention is to provide a vehicle display device capable of improving visibility of an image.

In order to achieve the above mentioned object, a vehicle display device according to one aspect of the present invention includes: an image display device having a display surface that displays an image; an optical system that projects display light of the image toward a reflection surface in front of a driver; and a control unit that controls the image display device, wherein the display surface includes a first region that is a region visually recognized by both eyes of the driver and a second region that is a region at a further end of the display surface in an image lateral direction relative to the first region, the control unit causes the image display device to display a first image when a display position of the image is in the first region, and causes the image display device to display a second image when a display position of the image is in a boundary between the first region and the second region, and the second image is an image having a pattern different from a pattern of the first image, and has a configuration in which a low luminance portion and a high luminance portion are combined.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

Figures 3, 4:
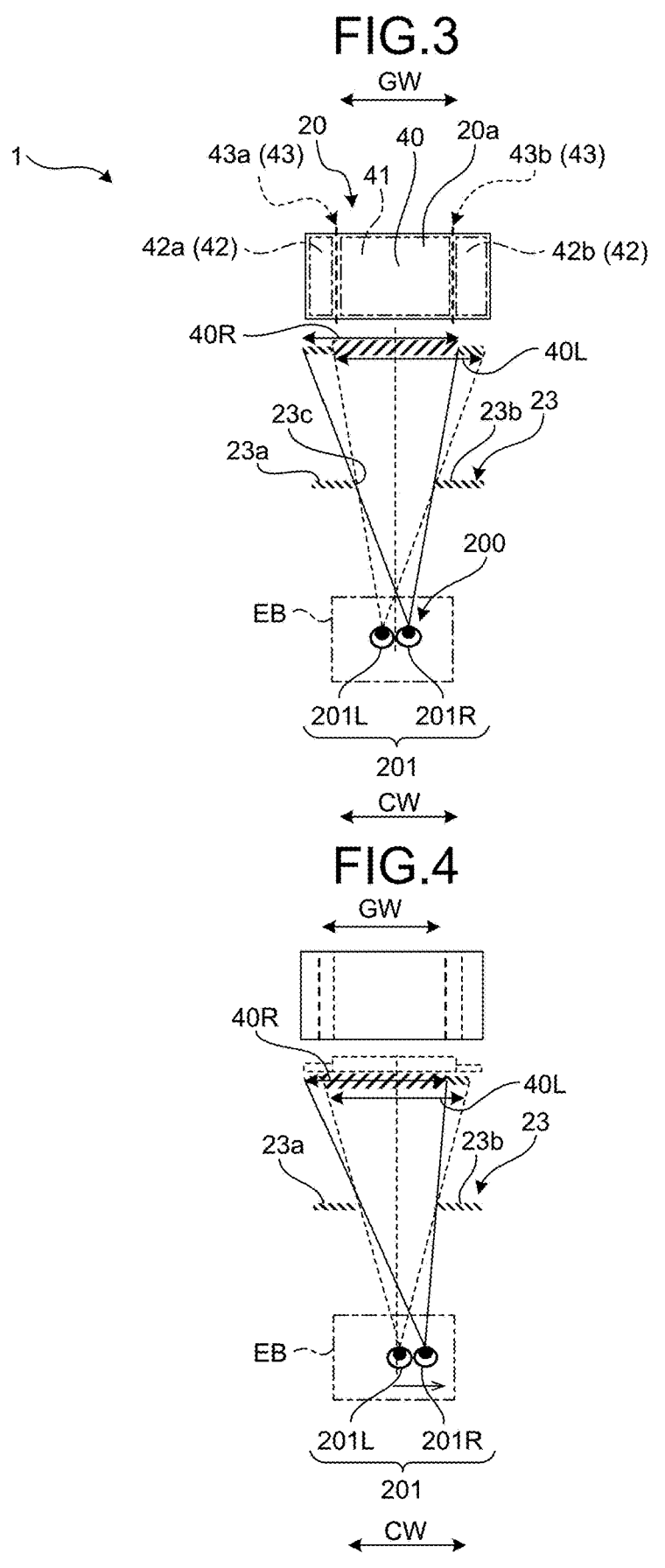

FIG. 3 is a diagram illustrating a range that can be visually recognized by left and right eyes;

FIG. 4 is a diagram illustrating a range that can be visually recognized by left and right eyes;

DETAILED DESCRIPTION OF THE PREFERRED EMBODIMENTS

Hereinafter, the vehicle display device according to an embodiment of the present invention will be described in detail with reference to the drawings. Note that the present invention is not limited by the embodiment. In addition, constituent elements in the following embodiments include those that can be easily assumed by those skilled in the art or those that are substantially the same.

EMBODIMENTS

Figure 1:
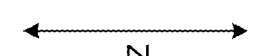
FIG. 1 is a diagram illustrating an arrangement of a vehicle display device according to an embodiment.
Figure 2:
FIG. 2 is a plan view illustrating a light shielding wall according to the embodiment.
Figure 2:
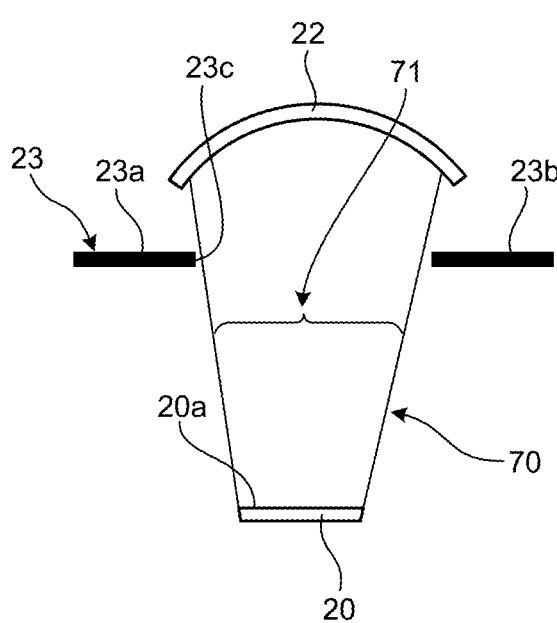
Figure 2:
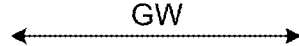
Figure 5:
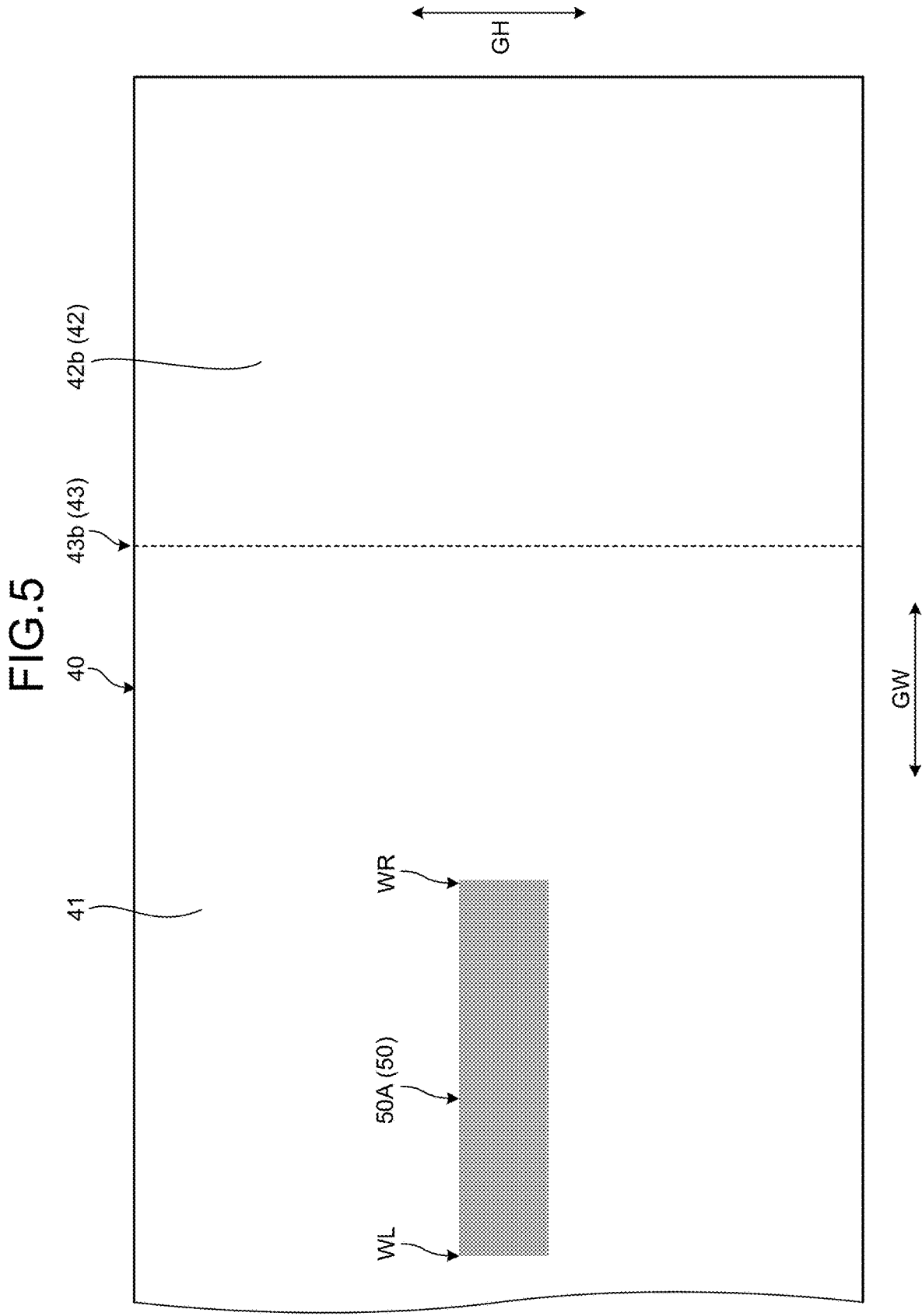
FIG. 5 is a diagram illustrating a first image according to the embodiment.
Figure 6:
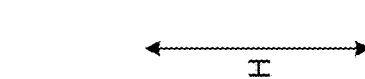
FIG. 6 is a diagram illustrating a second image according to the embodiment.
Figure 7:
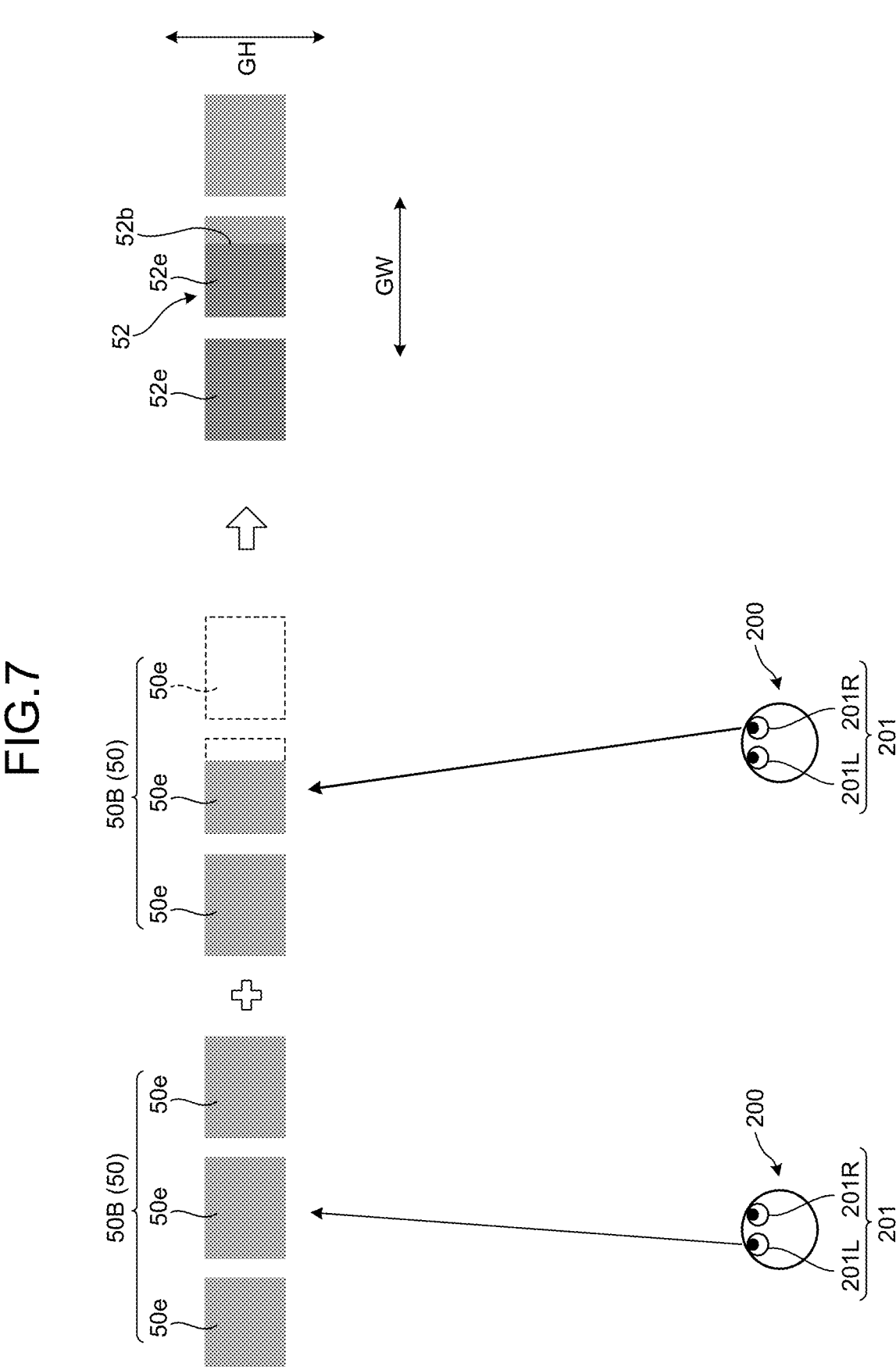
FIG. 7 is a diagram for describing images visually recognized by both eyes.
Figure 8:
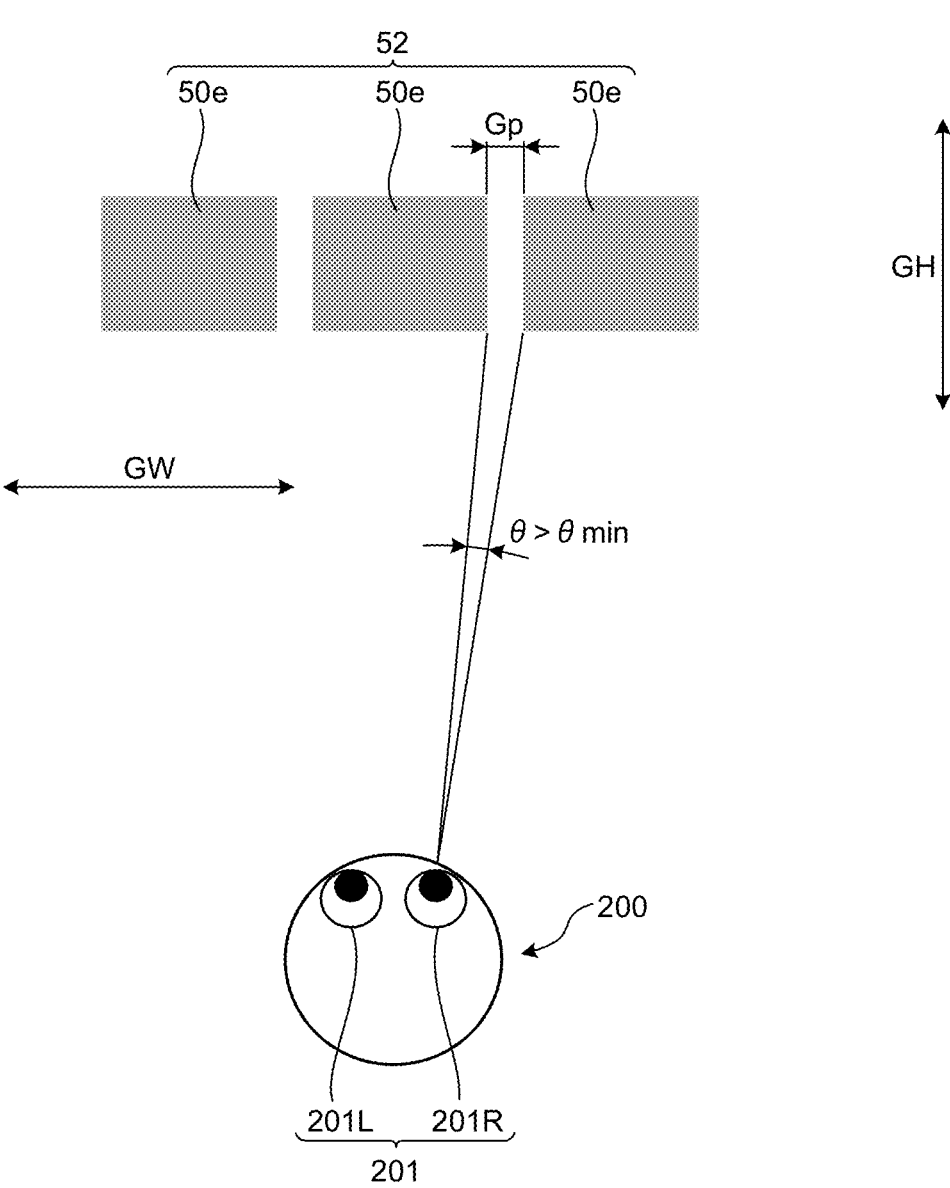
FIG. 8 is a diagram for describing a gap of a second image.
Figure 16:
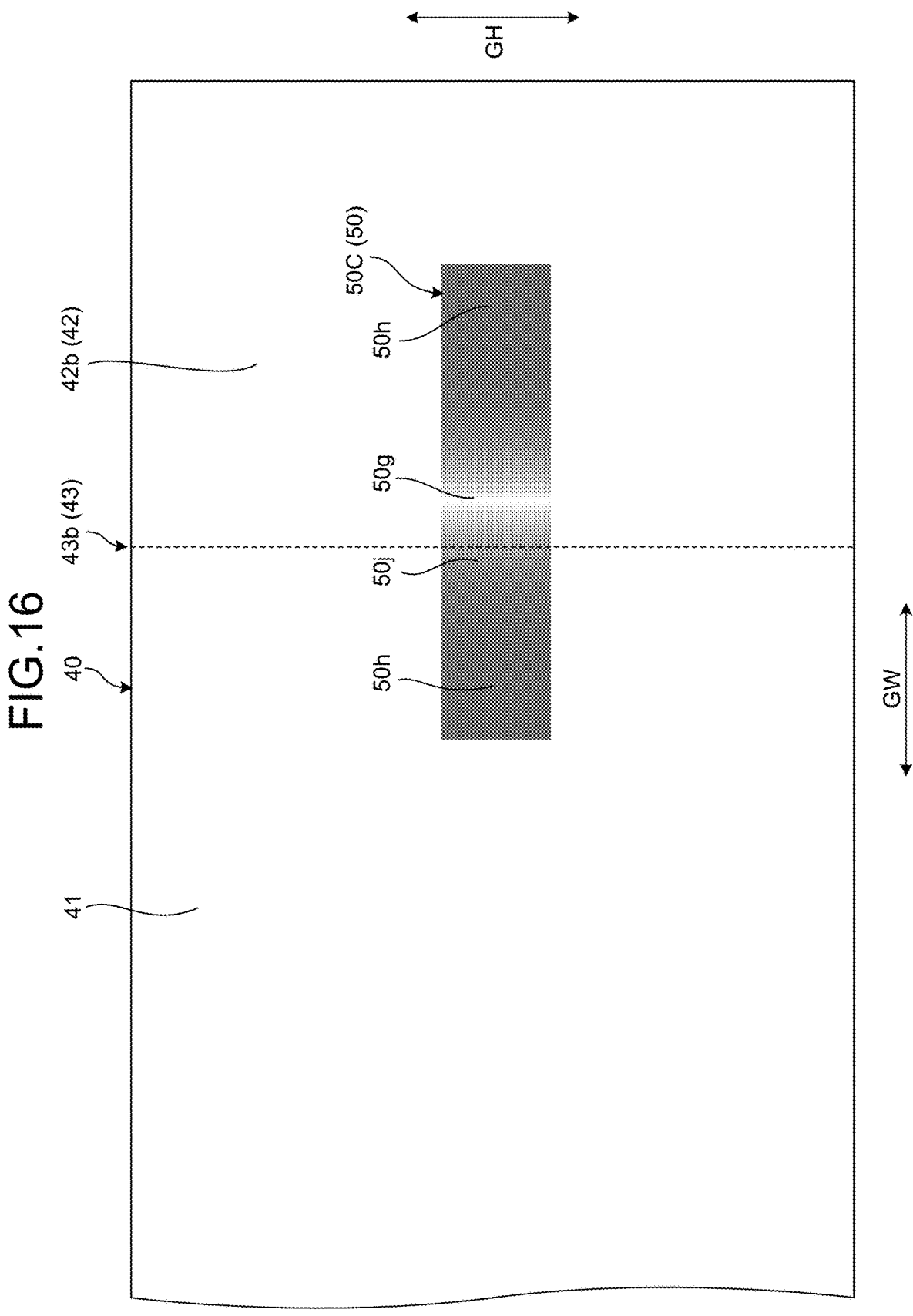
FIG. 16 is a diagram illustrating an example of a second image.
Figure 17:
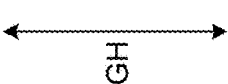
FIG. 17 is a diagram illustrating an example of a second image.
Figure 18:
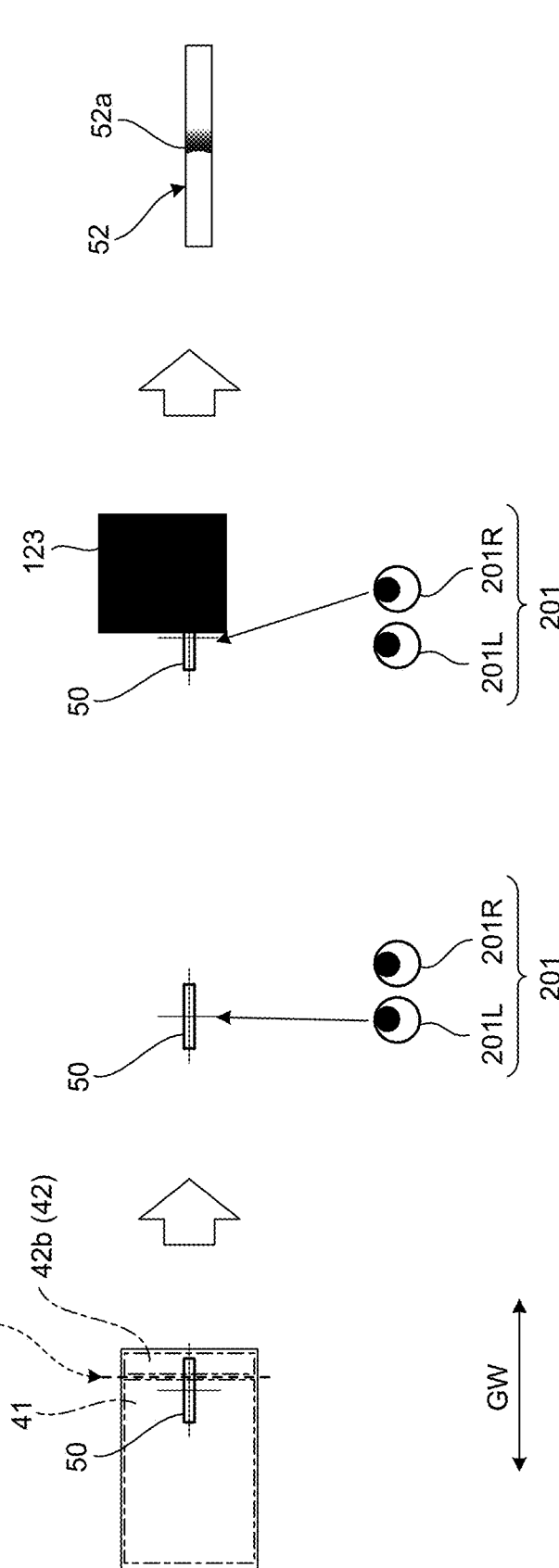
FIG. 18 is a diagram for describing a decrease in visibility of an image.

An embodiment will be described with reference to FIGS. 1 to 18. The present embodiment relates to a vehicle display device. FIG. 1 is a diagram illustrating an arrangement of a vehicle display device according to an embodiment, FIG. 2 is a plan view illustrating a light shielding wall according to the embodiment, FIGS. 3 and 4 are diagrams illustrating a range visually recognizable by left and right eyes, FIG. 5 is a diagram illustrating a first image of the embodiment, FIG. 6 is a diagram illustrating a second image of the embodiment, FIG. 7 is a diagram for describing images visually recognized by both eyes, FIG. 8 is a diagram for describing a gap of the second image, FIGS. 9 to 17 are diagrams illustrating an example of the second image, and FIG. 18 is a diagram for describing a decrease in visibility of the image.

As illustrated in FIG. 1, a vehicle display device 1 of the present embodiment is mounted on a vehicle 100 and constitutes a head-up display. The vehicle display device 1 is disposed inside an instrument panel, for example. The instrument panel is provided with an opening through which display light 70 passes. A driver monitor 7 that images a driver 200 is disposed in the vehicle 100.

The vehicle display device 1 includes a housing 4, a cover 5, a control unit 6, an image display device 20, and an optical system 25. The control unit 6, the image display device 20, and the optical system 25 are accommodated in the housing 4. The housing 4 includes a main body 2 and a lid member 3 that engages with the main body 2. The main body 2 has an opening that opens upward. The lid member 3 closes the opening of the main body 2 from above. The lid member 3 has a wall portion 30 facing a windshield 102 in the vehicle vertical direction Z. The shape of the lid member 3 in plan view is a rectangular frame shape. The wall portion 30 has an opening 31 opened upward. The cover 5 is a transparent plate-like member that closes the opening 31 of the lid member 3. The cover 5 is formed of, for example, a resin having translucency such as polycarbonate (PC) or acrylic.

The image display device 20 has a display surface that displays an image, and emits display light 70 of the image. The illustrated image display device 20 is a liquid crystal display device, and is, for example, a thin film transistor-liquid crystal display (TFT-LCD). The image display device 20 emits the display light 70 by the light of the backlight unit, for example. A heat sink 21 is disposed on the back surface of the image display device 20. The image display device 20 is not limited to the liquid crystal display device. The image display device 20 may be, for example, a device that scans laser light to generate an image on a transmissive screen.

The control unit 6 is a control circuit or a control device that controls the image display device 20. The control unit 6 is constituted by a computer having an arithmetic unit, a memory, a communication interface, and the like. The control unit 6 stores, for example, a program for executing the operation disclosed in the present specification in advance. The control unit 6 is configured to control a shape of an image displayed by the image display device 20, a position of the image, a luminance distribution of the image, and the like. In a case where the image display device 20 is a liquid crystal display device, the control unit 6 may control the luminance of a plurality of light sources included in the backlight unit. In a case where the image display device 20 is a device that scans laser light to form an image, the control unit 6 may control the output of the laser element according to the scanning position.

The optical system 25 includes a first mirror 22. The first mirror 22 reflects the display light 70 emitted from the image display device 20 toward a reflection surface 102a of the windshield 102. The shape of the reflection surface of the first mirror 22 is, for example, a free-form surface. The illustrated first mirror 22 is a concave mirror that reflects the display light 70 while enlarging the display light 70.

The display light 70 reflected by the first mirror 22 passes through the opening 31, and is reflected by the reflection surface 102a of the windshield 102 toward the driver 200. The reflection surface 102a of the windshield 102 is a final reflection surface facing an eyes 201 of the driver 200. The display light 70 incident on eyes 201 of the driver 200 forms a virtual image 10.

The vehicle display device 1 according to the present embodiment is configured to be capable of displaying a virtual image on the foreground of the vehicle 100. The vehicle display device 1 displays a virtual image on a road surface in front of the vehicle 100, a preceding vehicle of the vehicle 100, an attention target in front of the vehicle 100, or the like, for example.

As illustrated in FIG. 2, the image display device 20 includes a display surface 20a that displays an image. The display light 70 is emitted from the display surface 20a. The vehicle display device 1 includes a light shielding wall 23. The light shielding wall 23 is a wall portion that prevents the display light 70 from diffusing in an unnecessary direction. The illustrated light shielding wall 23 is disposed between the display surface 20a of the image display device 20 and the first mirror 22. The light shielding wall 23 includes a first light shielding wall 23a and a second light shielding wall 23b. The first light shielding wall 23a is located on the left side when the driver 200 views an image. The second light shielding wall 23b is located on the right side with the driver 200 views an image. For example, an opening 23c is provided between the first light shielding wall 23a and the second light shielding wall 23b. That is, the light shielding wall 23 is disposed on both sides of the image lateral direction GW so as to sandwich an optical path 71 of the display light 70.

As illustrated in FIG. 3, the display surface 20a has a display region 40 for displaying an image. In the display region 40, a range 40L that can be visually recognized by a left eye 201L and a range 40R that can be visually recognized by a right eye 201R of the driver 200 are determined by the width of the opening 23c of the light shielding wall 23 and the position of the opening 23c. The visually recognizable ranges 40L and 40R are ranges in the image lateral direction GW.

The position of the eyes 201 illustrated in FIG. 3 is the center position of an eye box EB in the vehicle width direction CW. The eye box EB is a range assumed in advance as a range in which the position of the eyes 201 moves. The eye box EB has a predetermined width in the vehicle width direction CW. The vehicle display device 1 is configured so that the display region 40 can be visually recognized by the driver 200 when the eyes 201 are inside the eye box EB.

FIG. 4 illustrates a state in which the position of the eyes 201 is closer to the right side in the eye box EB. In this case, the range 40L that can be visually recognized by the left eye 201L and the range 40R that can be visually recognized by the right eye 201R are shifted to left relative to the position illustrated in FIG. 3. Therefore, the region visually recognized by both eyes is shifted to the left side as compared with the case of FIG. 3. Conversely, in a case where the position of the eyes 201 is a position close to the left side in the eye box EB, the visually recognizable ranges 40R and 40L are shifted to the right side relative to the position illustrated in FIG. 3. That is, the range visible by both eyes of the driver 200 changes according to the position of the eyes 201 of the driver 200.

A first region 41 illustrated in FIG. 3 is a region that can be visually recognized by the driver 200 with both eyes. More specifically, the first region 41 is a region visually recognized by both eyes of the driver 200 regardless of the position of the eyes 201 in the eye box EB. A second region 42 illustrate in FIG. 3 is a region at the further end in the image lateral direction GW relative to the first region 41. In other words, the second region 42 is a region excluding the first region 41 in the entire region of the display region 40.

The second region 42 is a region that may be visually recognized by only one eye of the driver 200. The second region 42 has a left end region 42a and a right end region 42b. The left end region 42a is located left of the first region 41 when viewed from the driver 200. The left end region 42a is a region that may be visually recognized only by the right eye 201R of the driver 200. At least part of the left end region 42a may be visually recognized by both eyes of the driver 200 according to the position of the eyes 201.

The right end region 42b is located right of the first region 41 when viewed from the driver 200. The right end region 42b is a region that may be visually recognized only by the left eye 201L of the driver 200. At least part of the right end region 42b may be visually recognized by both eyes of the driver 200 according to the position of the eyes 201.

In the display region 40, a boundary line 43 between the first region 41 and the second region 42 is set. The position of the boundary line 43 is, for example, a fixed position. The boundary line 43 of the present embodiment includes a first boundary line 43a and a second boundary line 43b. The first boundary line 43a is a boundary line between the left end region 42a and the first region 41. The second boundary line 43b is a boundary line between the right end region 42b and the first region 41.

The first boundary line 43a is determined based on the range 40L that can be visually recognized by the left eye 201L. More specifically, the first boundary line 43a is the left end of the range 40L in a case where the eyes 201 are located at the leftmost side in the eye box EB. In the display region 40, a region left of the first boundary line 43a may not be visually recognized by the left eye 201L.

The second boundary line 43b is determined based on the range 40R that can be visually recognized by the right eye 201R. More specifically, the second boundary line 43b is the right end of the range 40R in a case where the eyes 201 are located on the rightmost side in the eye box EB. In the display region 40, a region right of the second boundary line 43b may not be visually recognized by the right eye 201R.

As described above, the first region 41 of the present embodiment is guaranteed to be visually recognized with both eyes as long as the eyes 201 of the driver 200 are inside the eye box EB. On the other hand, the second region 42 is a region that is not always visually recognized by both eyes of the driver 200.

Here, as described below, when the image crosses the boundary between the first region 41 and the second region 42, the visibility of the image may be reduced. On the left side of FIG. 18, an image 50 displayed across the second boundary line 43b is illustrated. The illustrated image 50 is displayed so as to be superimposed on an object in front of the vehicle 100. For example, the image 50 is superimposed a vehicle ahead. The image 50 is, for example, a linear figure extending in the image lateral direction GW or a rectangular image in which the image lateral direction GW is the longitudinal direction. Part of the image 50 is displayed in the first region 41, and the remaining part of the image 50 is displayed in the right end region 42b. In the center of FIG. 18, how the image 50 is viewed by the left eye 201L and how the image 50 is viewed by the right eye 201R are illustrated.

As illustrated in FIG. 18, the left eye 201L of the driver 200 can see the entire image 50. On the other hand, the right eye 201R can see only part of the image 50. The remaining part of the image 50 is hidden by a light shielding wall 123. In this case, as illustrated on the right side of FIG. 18, a black line 52a may be generated in a virtual image 52 visually recognized by the driver 200. The line 52a is generated at the right end position of the image 50 visible by the right eye 201R. In other words, the line 52a is generated by the edge of the light shielding wall 123. Since the brightness discontinuously changes with the edge of the light shielding wall 123 as a boundary, a problem that the clear line 52a is recognized occurs.

As described below, the vehicle display device 1 according to the present embodiment controls the luminance distribution in the image 50 according to the display position of the image 50. For example, the control unit 6 makes the luminance distribution in the image 50 different between the case in which the image 50 is displayed in the first region 41 and the case in which the image 50 is displayed at the boundary. Here, the boundary is a region including the boundary line 43 between the first region 41 and the second region 42.

FIG. 5 illustrates the image 50 displayed in the first region 41. FIG. 6 illustrates the image 50 displayed across the boundary line 43. In the following description, the image 50 displayed in the first region 41 is referred to as a "first image 50A", and the image 50 displayed across the boundary line 43 is referred to as a second image 50B. The first image 50A illustrated in FIG. 5 is an image of one figure continuous in the image lateral direction GW and the image vertical direction GH. The shape of the first image 50A is a rectangle along the image lateral direction GW.

On the other hand, the second image 50B illustrated in FIG. 6 is divided into three elements 50e disposed in the image lateral direction GW and displayed. In other words, the second image 50B is an image obtained by dividing the first image 50A into a plurality of parts by division lines in the image vertical direction GH. The image pattern of the second image 50B is different from the image pattern of the first image 50A in that, for example, the second image 50B includes a plurality of elements 50e. The number of elements 50e in the second image 50B is not limited to three.

The contour of the exemplified second image 50B is equal to the contour of the first image 50A. That is, the first image 50A is an image in which the rectangular image 50 is displayed as it is, and the second image 50B is an image in which the rectangular image 50 is divided into a plurality of small rectangles. The overall shape of the second image 50B is equal to the shape of the first image 50A. That is, the second image 50B is a rectangular figure formed by disposing the plurality of elements 50e in the same region as the first image 50A.

The luminance distribution in second image 50B is different from the luminance distribution in first image 50A. More specifically, the second image 50B is configured by alternately disposing bright portions and dark portions along the image lateral direction GW. The element 50e is the high luminance portion of the second image 50B, and a gap Gp between adjacent elements 50e is the low luminance portion of the second image 50B. On the other hand, in the first image 50A illustrated in FIG. 5, the luminance is uniformly distributed along the image lateral direction GW.

The control unit 6 may generate the second image 50B by mask a process on the first image 50A. The control unit 6 may store the first image 50A and the second image 50B as different images.

FIG. 7 illustrates the second image 50B visually recognized by the left eye 201L and the second image 50B visually recognized by the right eye 201R. As illustrated on the left side of FIG. 7, the left eye 201L can visually recognize the entire second image 50B. As illustrated in the center of FIG. 7, the right eye 201R can visually recognize only part of the second image 50B. In the example of FIG. 7, the right eye 201R cannot visually recognize part of the central element 50e and the entire right element 50e.

On the right side of FIG. 7, the virtual image 52 recognized by the driver 200 is illustrated. In the virtual image 52, a boundary line 52b between the high luminance portion on the left side and the low luminance portion on the right side is generated. The boundary line 52b is generated by a difference between the shape of the image visually recognized by the left eye 201L and the shape of the image visually recognized by the right eye 201R. In other words, the boundary line 52b is recognized by the left and right parallaxes. The virtual image 52 of the present embodiment includes a plurality of elements 50e separated from each other. Therefore, the boundary line 52b is less noticeable in the virtual image 52. In other words, the boundary line 52b hardly gives discomfort to the driver 200. Therefore, the vehicle display device 1 of the present embodiment can display the virtual image 52 with less discomfort.

Note that, as described with reference to FIG. 8, the size of the gap Gp between the adjacent elements 50e is desirably determined so that the two elements 50e can be identified by the driver 200. The size of the gap Gp is determined based on, for example, the optical path length from the eye box EB to the display surface 20a and the resolution of the eyes 201. As an example, the angle $\theta$ formed by the ends of the two elements 50e and the eyes 201 may be larger than the minimum angle $\theta$min. The minimum angle $\theta$min may be determined by the resolution of the eyes 201, for example, may be $\frac{1}{60}$ [°].

The control unit 6 of the present embodiment sets the display position of the image 50 on the display surface 20a based on the position of the object. Examples of the object include a preceding vehicle, an obstacle ahead, a pedestrian, and a road surface ahead. The position of the object is calculated based on, for example, an image ahead obtained by imaging a region in front of the vehicle 100. The image ahead is generated by a camera mounted on the vehicle 100. Based on the position of the object, the control unit 6 calculates the display position of the image 50 so that the image 50 overlaps the object.

When the display position of the image 50 is inside the first region 41, the control unit 6 instructs the image display device 20 to display the first image 50A. For example, the control unit 6 calculates the left end position WL and the right end position WR of the image 50 illustrated in FIG. 5 based on the display position of the image 50. In this case, when both the left end position WL and the right end position WR are positions inside the first region 41, the control unit 6 determines that the display position of the image 50 is inside the first region 41. The image display device 20 displays the first image 50A in the first region 41 in accordance with an instruction by the control unit 6. Accordingly, as illustrated in FIG. 5, the first image 50A is displayed in the first region 41. The driver 200 can visually recognize the first image 50A with both eyes.

When the display position of the image 50 is at the boundary between the first region 41 and the second region 42, the control unit 6 instructs the image display device 20 to display the second image 50B. For example, the control unit 6 determines that the image 50 crosses the boundary line 43 in a case where one of the left end position WL and the right end position WR is located in the first region 41 and the other in the second region 42. The image display device 20 displays the second image 50B at the boundary as illustrated in FIG. 6 according to the instruction by the control unit 6.

According to such a process, when the display position of the image 50 moves from the first region 41 toward the second region 42 following the object, the display mode of the image 50 switches from the first image 50A to the second image 50B. When the entire image 50 is displayed in the second region 42, the control unit 6 may instruct the image display device 20 to display the first image 50A.

When the display position of the image 50 moves from the boundary between the first region 41 and the second region 42 to the first region 41, the control unit 6 switches the display mode of the image 50 from the second image 50B to the first image 50A. Therefore, the vehicle display device 1 of the present embodiment can realize appropriate virtual image display with less discomfort.

Figure 9:
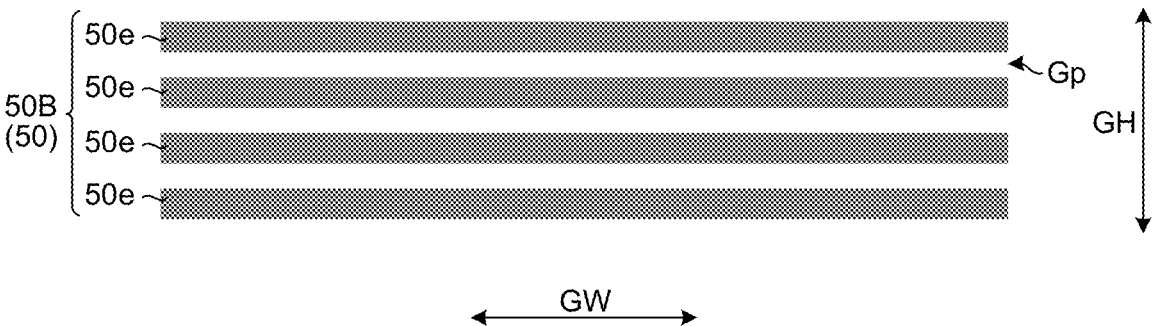
FIG. 9 is a diagram illustrating an example of a second image.

FIG. 9 illustrates an example of the second image 50B. The second image 50B illustrated in FIG. 9 is divided into four elements 50e disposed in the image vertical direction GH. Each element 50e extends in the image lateral direction GW from one end to the other end of the second image 50B. In other words, the second image 50B is an image in which the first image 50A is divided into a plurality of parts by division lines in the image lateral direction GW. The gap Gp is provided between the adjacent elements 50e. Since the second image 50B is configured by the plurality of elements 50e, the light-dark boundary line 52b is less noticeable.

Figure 10:
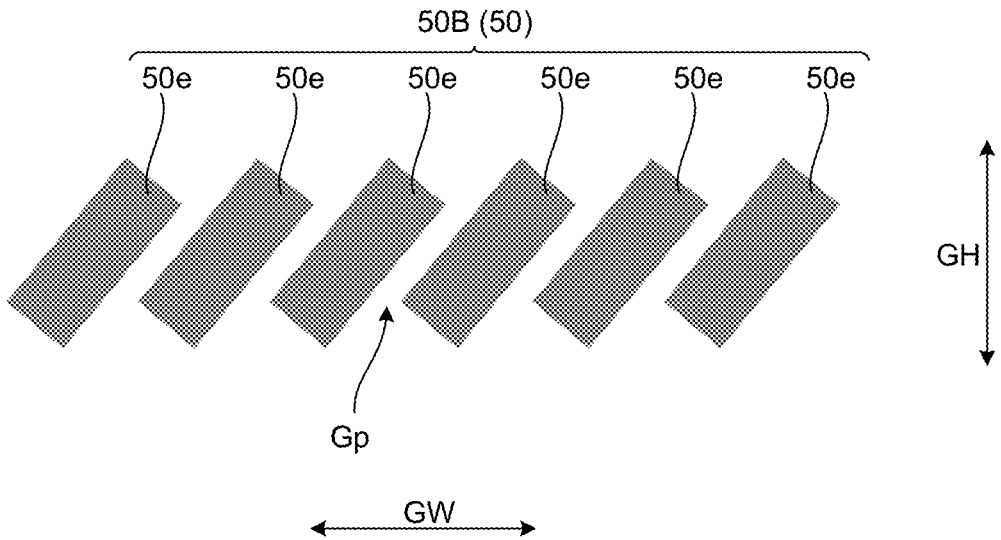
FIG. 10 is a diagram illustrating an example of a second image.

FIG. 10 illustrates another example of the second image 50B. The second image 50B illustrated in FIG. 10 is divided into a plurality of elements 50e disposed in the image lateral direction GW. Each element 50e is inclined with respect to the image vertical direction GH. That is, the second image 50B in FIG. 10 is divided into a plurality of parts by division lines inclined with respect to the image vertical direction GH. The inclination angles of the plurality of elements 50e are equal. The gap Gp is provided between the adjacent elements 50e.

Figure 11:
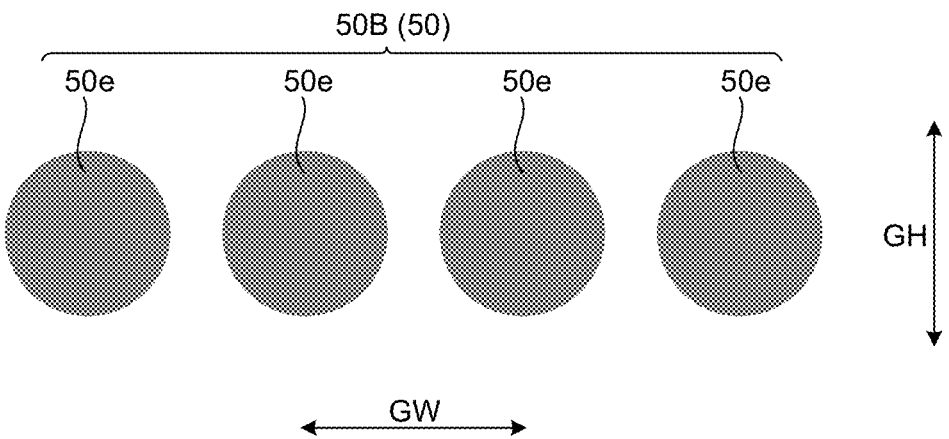
FIG. 11 is a diagram illustrating an example of a second image.

FIG. 11 illustrates another example of the second image 50B. The second image 50B illustrated in FIG. 11 is divided into a plurality of elements 50e disposed in the image lateral direction GW. The shape of the element 50e is circular. The shape of the element 50e is not limited to a quadrangle, and may be a circle as illustrated in FIG. 11. The shape of the element 50e may be a polygon such as a hexagon.

Figure 12:
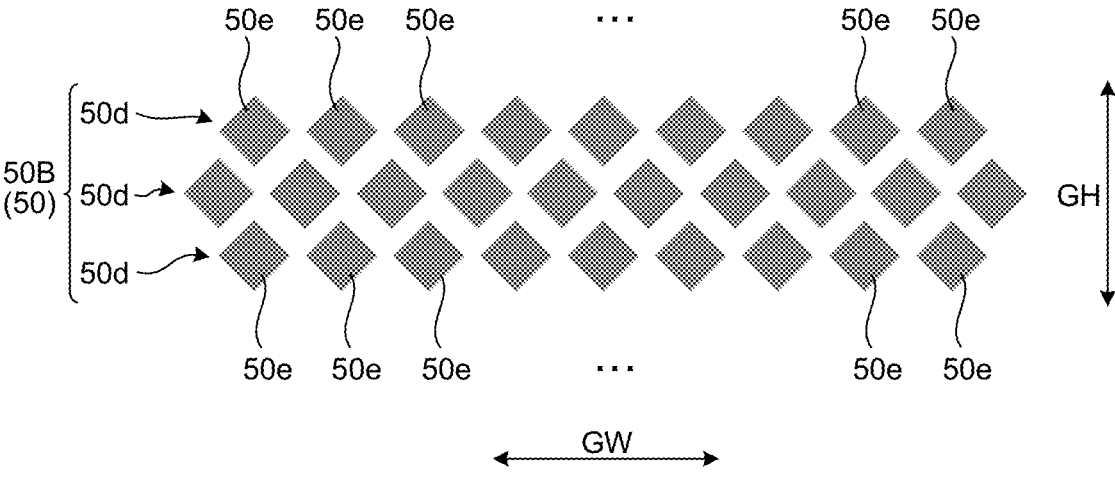
FIG. 12 is a diagram illustrating an example of a second image.

FIG. 12 illustrates another example of the second image 50B. The second image 50B illustrated in FIG. 12 has a plurality of element groups 50d. The element group 50d extends in the image lateral direction GW and has a plurality of elements 50e disposed in the image lateral direction GW. The plurality of element groups 50d is disposed in the image vertical direction GH. The shape of the illustrated element 50e is rectangular. The plurality of elements 50e included in the element group 50d is disposed so that a diagonal line is parallel to the image lateral direction GW.

Figure 13:
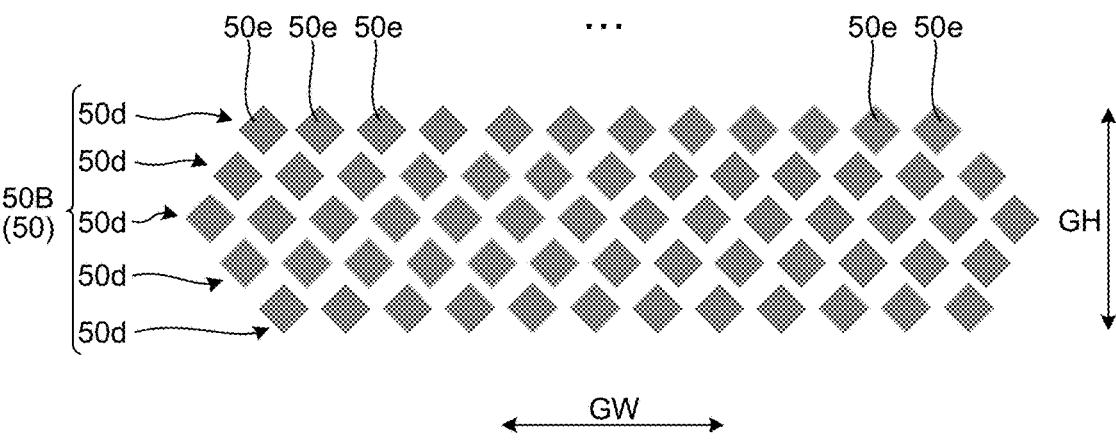
FIG. 13 is a diagram illustrating an example of a second image.

FIG. 13 illustrates another example of the second image 50B. The second image 50B illustrated in FIG. 13 has more element groups 50d than the second image 50B illustrated in FIG. 12. In addition, each element group 50d has more elements 50e than the element group 50d illustrated in FIG. 12. By increasing the number of divisions in the second image 50B, the light-dark boundary line 52b is less noticeable. For example, by increasing the number of element groups 50d in the second image 50B or increasing the number of elements 50e in the element group 50d, botheration by the boundary line 52b is reduced.

Figure 14:
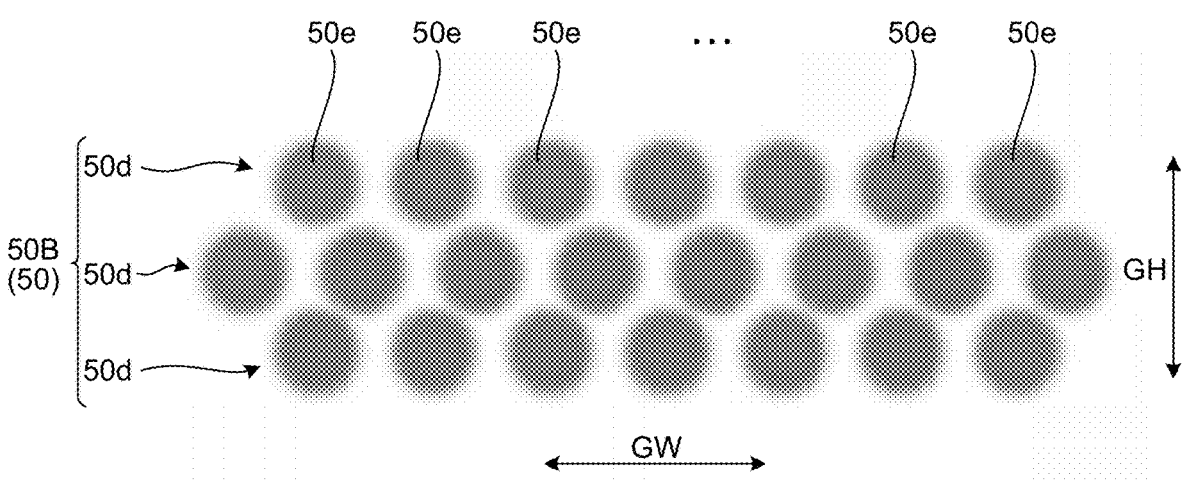
FIG. 14 is a diagram illustrating an example of a second image.

FIG. 14 illustrates another example of the second image 50B. The second image 50B illustrated in FIG. 14 has a plurality of element groups 50d. Each element 50e illustrated in FIG. 14 is a blurred design. The element 50e is blurred at least so that the contour is not clear. The element 50e is generated by, for example, a blurring process on a circular image. Since the contour of the element 50e is blurred, the boundary line 52b is less noticeable.

Figure 15:
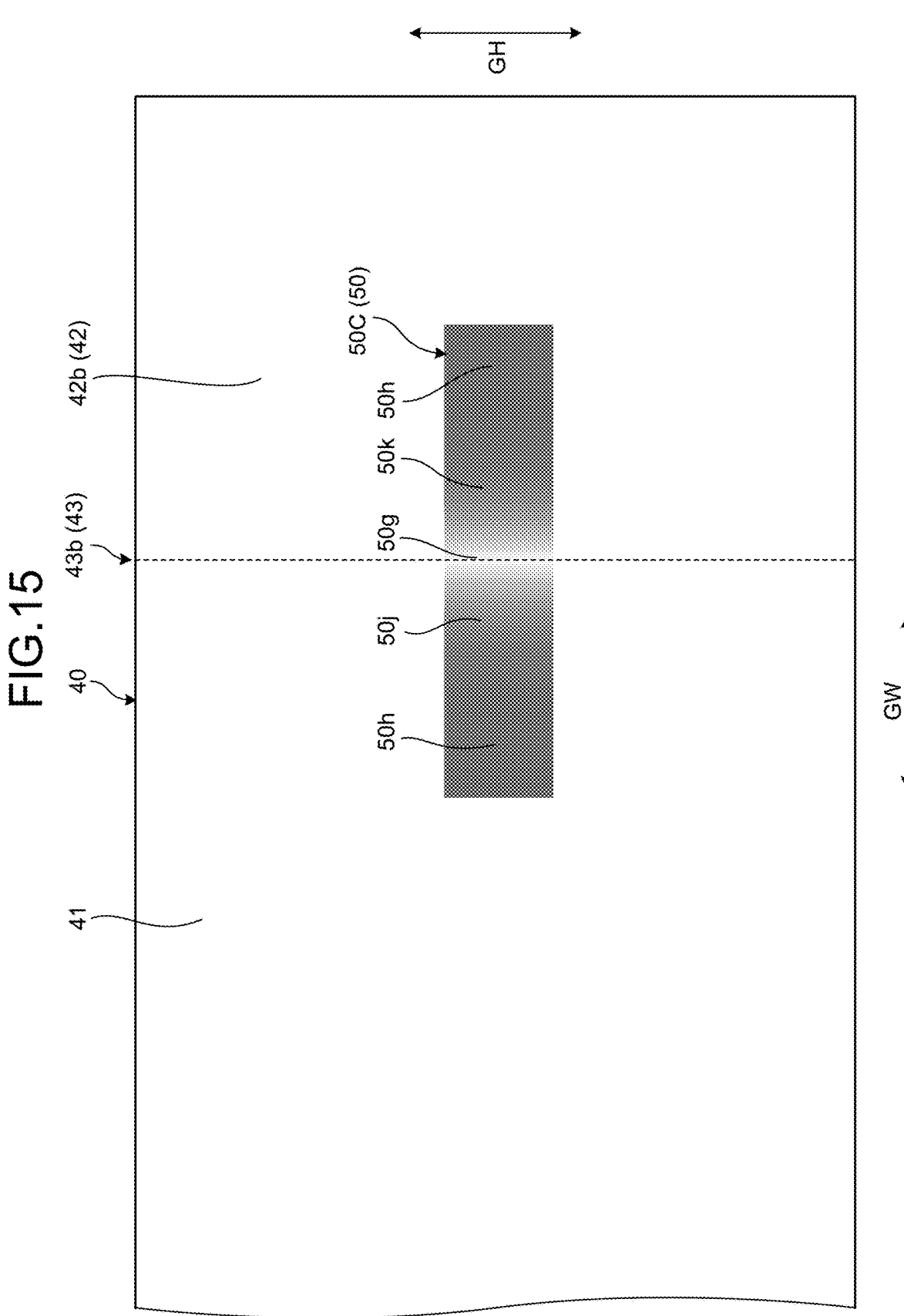
FIG. 15 is a diagram illustrating an example of a second image.

FIG. 15 illustrates a second image 50C. The second image 50C is a gradation image. The second image 50C is an image obtained by applying gradation in which luminance changes along the image lateral direction GW in the first image 50A. When displaying the image 50 at the boundary between the first region 41 and the second region 42, the control unit 6 may display the second image 50C. The image pattern of the second image 50C is different from the image pattern of the first image 50A in that, for example, the second image 50C has gradation.

The exemplified second image 50C has a low luminance portion 50g at the center in the image lateral direction GW, and has a high luminance portions 50h at both ends. The second image 50C has gradation. The second image 50C has gradation in which the luminance of the pixel decreases from the high luminance portion 50h toward the low luminance portion 50g. More specifically, the second image 50C includes a first intermediate portion 50j and a second intermediate portion 50k. The first intermediate portion 50j is a gradation portion in which the luminance decreases from the left high luminance portion 50h toward the low luminance portion 50g. The second intermediate portion 50k is a gradation portion in which the luminance increases from the low luminance portion 50g toward the right high luminance portion 50h. The second image 50C illustrated in FIG. 15 is displayed so that the center of the low luminance portion 50g is located at the boundary line 43.

The position of the low luminance portion 50g in the second image 50C may be variable. For example, the position of the low luminance portion 50g in the second image 50C may be adjusted so that the low luminance portion 50g overlaps the boundary line 43.

The second image 50C may be displayed so that the first intermediate portion 50j or the second intermediate portion 50k overlaps the boundary line 43. The second image 50C illustrated in FIG. 16 is displayed so that the first intermediate portion 50j is located at the boundary line 43. In other words, the second image 50C has gradation in which the luminance decreases from the first region 41 toward the boundary line 43, and this gradation portion overlaps the boundary line 43.

The second image 50C may have the high luminance portion 50h only on one side of the low luminance portion 50g in the image lateral direction GW. For example, as illustrated in FIG. 17, the low luminance portion 50g may be located at an end portion of the second image 50C in the image lateral direction GW.

As described above, the vehicle display device 1 of the present embodiment includes the image display device 20, the optical system 25, and the control unit 6. The image display device 20 includes the display surface 20a that displays the image 50. The optical system 25 projects the display light 70 of the image toward the reflection surface 102a in front of the driver 200. The control unit 6 controls the image display device 20. The display region 40 of the display surface 20a includes the first region 41 and the second region 42. The first region 41 is a region visually recognized by both eyes of the driver 200. The second region 42 is a region at the further end of the display surface 20a in the image lateral direction GW relative to the first region 41.

When the display position of the image 50 is in the first region 41, the control unit 6 causes the image display device 20 to display the first image 50A. When the display position of the image 50 is at the boundary between the first region 41 and the second region 42, the control unit 6 causes the image display device 20 to display the second images 50B and 50C. The second images 50B and 50C are images having a pattern different from that of the first image 50A, and have a configuration in which a low luminance portion and a high luminance portion are combined. For example, the second image 50B has the element 50e having high luminance and the gap Gp having low luminance. The second image 50C includes the high luminance portion 50h and the low luminance portion 50g. The vehicle display device 1 of the present embodiment can improve the visibility of the image by making the boundary line 52b less noticeable when the image is displayed at the boundary.

The first image 50A of the present embodiment is an image of one figure. The second image 50B is an image of a figure configured by disposing a plurality of elements 50e. Since the second image 50B includes the plurality of elements 50e, the boundary line 52b is less noticeable.

In the second image 50B of the present embodiment, the gap Gp is provided between the adjacent elements 50e. The gap Gp generates a boundary line between the low luminance portion and the high luminance portion. Therefore, the boundary line 52b due to parallax is less noticeable.

The second image 50C of the present embodiment is an image having gradation in which luminance changes along the image lateral direction GW. Since the second image 50C has a change in brightness, the boundary line 52b is less noticeable.

In the gradation of the second image 50C of the present embodiment, the luminance decreases toward the boundary line 43 between the first region 41 and the second region 42. Such gradation makes the boundary line 52b less noticeable.

The shapes of the first image 50A and the second images 50B and 50C are not limited to the shapes exemplified in the present embodiment. For example, the shape of the first image 50A may be an elliptical shape or a ring shape. In this case, the second image 50B may be an elliptical or ring-shaped image including a plurality of elements 50e.

The control unit 6 may cause the image display device 20 to display the second image 50B even when the image does not cross the boundary line 43. For example, a boundary region having a constant width may be set in the boundary line 43. In this case, the control unit 6 may cause the image display device 20 to display the second image 50B in a case where the image 50 overlaps the boundary region.

Modification of Embodiment

A modification of the embodiment will be described. The modification of the embodiment is different from the above embodiment in that, for example, the position of the boundary line 43 is determined according to the position of the eyes 201. The control unit 6 according to the modification of the embodiment changes the position of the boundary line 43 on the display surface 20a according to the position of the eyes 201.

For example, the control unit 6 detects the position of the eyes 201 of the driver 200 based on the image acquired by the driver monitor 7. The position of the eyes 201 is, for example, the center between the position of the left eye 201L and the position of the right eye 201R. The control unit 6 determines the position of the boundary line 43 based on the position of the eyes 201 in the vehicle width direction CW. By such processing, the first image 50A and the second images 50B and 50C can be appropriately switched according to the actual position of the eyes 201.

The content disclosed in the above embodiments and modifications can be appropriately combined and executed.

In the vehicle display device according to the present embodiment, the second image displayed at the boundary is an image having a pattern different from that of the first image, and has a configuration in which a low luminance portion and a high luminance portion are combined. The second image having the low luminance portion and the high luminance portion can reduce the sense of discomfort caused by the difference between the shape of the image visually recognized by the left eye and the shape of the image visually recognized by the right eye. Therefore, the vehicle display device according to the present embodiment has an effect of improving visibility of an image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
an image display device having a display surface that displays an image;
an optical system that projects display light of the image toward a reflection surface in front of a driver; and
a control unit that controls the image display device, wherein
the display surface includes a first region that is a region visually recognized by both eyes of the driver and a second region that is a region at a further end of the display surface in an image lateral direction relative to the first region,
the control unit causes the image display device to display a first image when a display position of the image is in the first region, and causes the image display device to display a second image when a display position of the image is in a boundary between the first region and the second region, the second image is an image having a pattern different from a pattern of the first image, and has a configuration in which a low luminance portion and a high luminance portion are combined,
the first image is an image of one figure, and
the second image is an image of a figure having a configuration in which a plurality of elements is disposed.

2. The vehicle display device according to claim 1, wherein
the second image is divided into the plurality of elements disposed in the image vertical direction,
or the second image is divided into the plurality of elements by division lines inclined with respect to the image vertical direction,
or the second image is divided into the plurality of elements disposed in the image lateral direction,
or the second image has a plurality of element groups disposed in the image vertical direction, the plurality of element groups extends in the image lateral direction and has the plurality of elements disposed in the image lateral direction.

3. The vehicle display device according to claim 1, wherein
a gap is provided between the adjacent ones of the elements.

4. The vehicle display device according to claim 1, wherein
the second image is an image having gradation in which luminance changes along an image lateral direction.

5. The vehicle display device according to claim 4, wherein
the luminance in the gradation of the second image decreases toward a boundary line between the first region and the second region.

* * * * *